Sept. 6, 1966     W. H. CHURCHILL ET AL     3,270,996

COAT HOOK AND ATTACHMENT

Filed Dec. 1, 1965

Inventors:
Julius B. Wilhelmi &
Wilmer H. Churchill,
by Gordon Herkimer
Atty.

United States Patent Office 3,270,996
Patented Sept. 6, 1966

3,270,996
COAT HOOK AND ATTACHMENT
Wilmer H. Churchill, Wellesley, and Julius B. Wilhelmi, Nantasket, Mass., assignors to United-Carr Incorporated, Boston, Mass., a corporation of Delaware
Filed Dec. 1, 1965, Ser. No. 510,837
2 Claims. (Cl. 248—224)

This invention relates generally to fastening devices and more specifically to a socket portion adapted to engage a stud.

An object of the present invention is to provide a plastic article of manufacture having a longitudinal slot engageable with a stud.

Another object of the present invention is to provide a coat hook engageable to a pair of studs attached to a support without penetration of the support.

Other objects of the invention will, in part, be obvious and will, in part, appear hereinafter.

Figure 1:
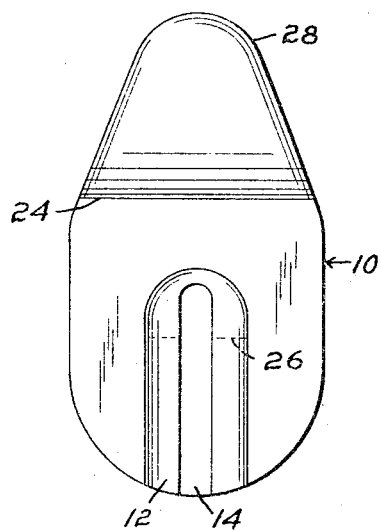
FIG. 1 is a bottom plan view of the coat hook.
Figure 2:
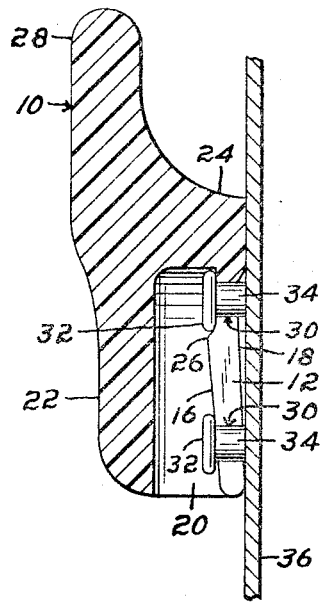
FIG. 2 is a section showing the coat hook of FIG. 1 attached to a pair of studs fastened to a support.
Figure 3:
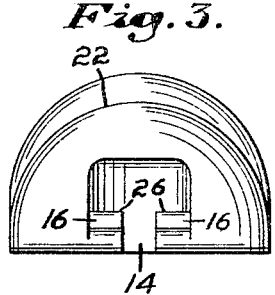
FIG. 3 is an end elevation of the coat hook looking at the opening of the cavity.

There is shown in the drawing a coat hook 10 comprising a base portion 12 having a longitudinal slot 14 formed therethrough and having its upper surface 16 sloped to provide a ramp for a part of the length of the base portion 12 and having its lower surface 18 inclined slightly upwardly. The base portion 12 has a pair of spaced side edges, each of which has a side wall 20 extending upwardly therefrom in substantially right angle relationship to the base portion 12. The side walls 20 are connected by a cap portion 22 which is in spaced, superimposed relation to the base portion 12. An end wall 24, remote from the leading edge of the base portion 12, connects the base portion 12, the side walls 20 and the cap portion 22 as shown in FIG. 2. The upper surface 16 of the base portion 12 is cupped adjacent to the end wall 24 to provide an engagement depression 26 to engage the head of the stud. The depression 26 extends to the end wall 24 traversely of the slot 14. The cap portion 22 is extended beyond the end wall 24 to provide a tongue portion 28 having the external configuration of a truncated cone rounded at its terminal end.

The stud 30 comprises an enlarged head portion 32 having an integral shank portion 34 extending axially therefrom with the diameter of the head portion 32 being greater than the diameter of the shank portion 34. The other end of the shank portion 16 remote from the head portion 32 is adapted to be welded or otherwise fastened to a surface of a support 36. The attachment between the shank portion 34 and the support 36 is accomplished without forming any apertures or holes through the support 36. Two studs 30 are attached to the support 36 by welding, soldering or adhesively securing the free terminal end in a spaced aligned relationship.

To engage the coat hook 10 to the aligned studs 30, the base portion 12 is pushed toward the studs 30 with the tongue portion 28 in an upright position. The shank portions 34 are passed into the longitudinal slot 14 and the head portion 32 flexes the base portion toward the support 36. The flexing operation is assisted by the fact that the lower surface 18 of the base portion 12 because of its inclination is spaced slightly from the support 36 as shown in FIG. 2. The fastening operation is completed when the uppermost stud 30 snaps into the depression 26 with its head portion 32 resting in superimposed abutting relationship on the bottom part of the depression 26 and the head portion 32 of the lower stud rests on the inclined upper surface 16.

With reference to the foregoing description it is to be understood that what has been disclosed herein represents only a single embodiment of the invention and is to be construed as illustrative rather than restrictive in nature; and that the invention is best described by the following claims.

What is claimed:

1. The combination of a fastening device, a support and an article, said article having a base portion, said base portion having an upper surface, sloped to provide a ramp, a lower surface in substantially parallel relationship with upper surface and a forward edge, a longitudinal slot extending through said base portion and extending from said forward edge, said fastening device including at least one stud, said stud comprising a head portion having a shank portion extending therefrom, said shank having a free terminal end, said stud secured at said terminal end of said shank to said support without perforating said support and said head portion overlying in abutting relation a portion of said upper surface of said base portion adjacent said slot and a portion of said shank portion lying within said slot and a part of said lower surface abutting said support.

2. The combination of a fastening device, a support and an article, as set forth in claim 1 wherein said fastening device comprises at least two studs attached to said support without perforation of said support, said studs being in spaced aligned relation to each other, an end wall extending from said base portion remote from said forward edge and a depression formed in said upper surface of said base portion traverse said slot and adjacent said end wall and said end portion of one of said studs overlying said base portion within said depression and the other of said studs having its head portion in abutting relation to said upper surface.

References Cited by the Examiner
UNITED STATES PATENTS 1,596,603   8/1926   Enoch _____ 248—224
1,709,144   4/1929   Mueller _____ 248—224

CLAUDE A. LE ROY, Primary Examiner.